L. C. ACHOR & W. BALL
FLOOD FENCE.
No. 180,407.
Patented Aug. 1, 1876.
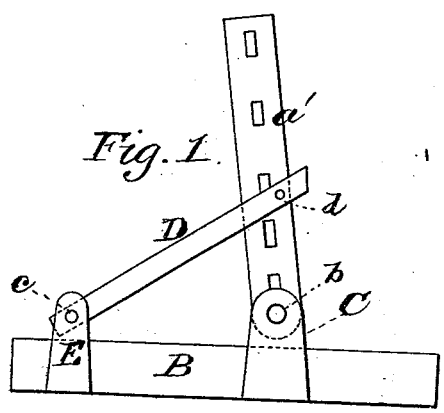
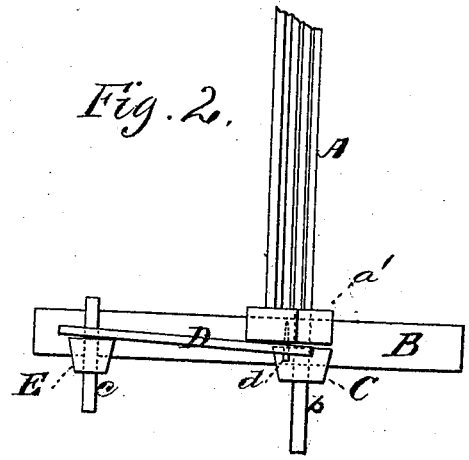
WITNESSES
Villette Anderson.
F. J. Clasi
INVENTORS
Lewis C. Achor
William Ball
By E. W. Anderson,
Attorney

UNITED STATES PATENT OFFICE.

LEWIS C. ACHOR AND WILLIAM BALL, OF NEW VIENNA, OHIO.

IMPROVEMENT IN FLOOD-FENCES.

Specification forming part of Letters Patent No. 180,407, dated August 1, 1876; application filed February 12, 1876.

*To all whom it may concern:*

Be it known that we, LEWIS C. ACHOR and WM. BALL, of New Vienna, in the county of Clinton and State of Ohio, have invented a new and valuable Improvement in Flood and other Fences; and we do hereby declare that the following is a full, clear, and exact description of the construction and operation of the same, reference being had to the annexed drawings, making a part of this specification, and to the letters and figures of reference marked thereon.

Figure 1 is an end view of our invention, showing the sills. Fig. 2 is a plan view of the same.

This invention has relation to improvements in portable fences.

The nature of the invention consists in the combination, with the fence-sections and braces, of transverse mud-sills having side recesses, expanding, in dovetail form, downward and inward, and the sill-posts having a similar double-dovetailed form, let into the said sills from below and projecting upward above the sill, whereby I am enabled to secure the panels to the sills above the ground; and the sill-posts are secured to the sills without nails or other like devices, as will be hereinafter more fully explained.

In the annexed drawings, the letter A designates a fence-panel, consisting of the rails $a$, mortised into, or otherwise suitably secured to, upright end pieces $a'$. B are mud-sills, which are buried in the ground a sufficient distance to prevent them from being washed up, and whose length is in the line of the water-flow. These sills are arranged at a suitable distance apart, according to the length of the panels designed to be used, and are provided with uprights C, of sufficient length to reach above the surface of the ground. To these uprights are pivoted the lower ends of side or end pieces $a'$ of panel A, wooden or metallic journal-pins $b$ being used for the purpose, by which means the said panel will be allowed to vibrate vertically, under circumstances hereinafter mentioned.

D represents braces, preferably of wood, the lower ends of which are pivoted by means of pins $c$ to uprights E upon the mud-sills. These braces are secured to end pieces $a'$ of the panel by means of break-pins $d$, which will be of sufficient strength to resist ordinary strain, but will be broken off when subjected to the rush of water occurring during a freshet, and will allow the panel to vibrate upon journal-pins $b$ down stream, thus opposing its edge to the force of the current, and effectually preventing the panel from being carried away thereby. In practice sills B may be anchored, or secured to the soil in any suitable manner; but usually I shall bury them in the ground.

In practice, uprights E C will be let into the sills from below, a tapering dovetailed groove being cut therein for the reception of the said uprights, which are of corresponding shape, thus preventing them from being drawn upward out of their grooves by the action of water upon the panels, and dispensing with all other fastenings, such as nails, screws, or bolts, which, being buried in the ground, would be liable to corrode from exposure to moisture. Posts E C, being of wood and wedge-shaped from below upward, will swell and hold to the sills more firmly than by ordinary construction, and, being dovetailed into the same, cannot become detached therefrom by lateral displacement.

We claim—

In a flood-fence, the combination, with the pivoted fence-sections A and pivoted braces D, of the transverse mud-sills B, having side recesses expanding in dovetail form downward and outward, and the sill-posts E C, having similar double-dovetail form at their bases, seated in said recesses from below, and projecting upward above the sill to receive the pivots, substantially as specified.

In testimony that we claim the above we have hereunto subscribed our names in the presence of two witnesses.

LEWIS C. ACHOR.
      WILLIAM BALL.

Witnesses:
 MORGAN A. WILLIAMS,
 GEO. E. BARROW.